US006970101B1

(12) United States Patent
Squire et al.

(10) Patent No.: US 6,970,101 B1
(45) Date of Patent: Nov. 29, 2005

(54) PARKING GUIDANCE METHOD AND SYSTEM

(76) Inventors: James C Squire, 1949 Mountain View Rd., Buena Vista, VA (US) 24416; Jenny L Dinneen, 18716 Scottsdale Blvd., Shaker Heights, OH (US) 44122; Brian D Holt, 9350 Gloxinia Way, Manassas, VA (US) 20110; Tsung-ta Ho, 10447 Nolan Dr., Rockville, MD (US) 20850; Troy J Siemers, 108 Harper Ct., Staunton, VA (US) 24401

(*) Notice: Subject to any disclaimer, the term of this patent is extended or adjusted under 35 U.S.C. 154(b) by 133 days.

(21) Appl. No.: 10/419,375

(22) Filed: Apr. 21, 2003

(51) Int. Cl.[7] .................................................. B60Q 1/48
(52) U.S. Cl. .............. 340/932.2; 340/933; 340/309.16; 705/13
(58) Field of Search ............................ 340/932.2, 942, 340/525, 928, 309.16, 933; 701/117; 235/90; 705/13, 418

(56) References Cited

U.S. PATENT DOCUMENTS 3,376,547 A 4/1968 Auer, Jr. ...................... 340/51
5,004,997 A 4/1991 Shisgal et al. .............. 340/436
5,091,727 A * 2/1992 Mahmood ................ 340/932.2
5,177,479 A * 1/1993 Cotton .................... 340/932.2
5,432,508 A * 7/1995 Jackson ................... 340/932.2
5,504,314 A 4/1996 Farmont ...................... 235/384
5,910,782 A 6/1999 Schmitt et al. ............. 340/995
5,940,481 A * 8/1999 Zeitman ....................... 705/13
6,107,942 A 8/2000 Yoo et al. ................ 340/932.2
6,147,624 A 11/2000 Clapper ................... 340/932.2
6,285,297 B1 9/2001 Ball ........................ 340/932.2
6,426,708 B1 7/2002 Trajkovic et al. ........ 340/932.2
6,771,185 B1 * 8/2004 Yoo et al. ................ 340/932.2

FOREIGN PATENT DOCUMENTS

JP 405040900 * 2/1993 .............. 340/932.2

* cited by examiner

*Primary Examiner*—Phung T. Nguyen
(74) *Attorney, Agent, or Firm*—Bell, Boyd & Lloyd MacLane Key

(57) ABSTRACT

A method of matching a vehicle with a vacant parking space in a parking facility having numerous parking spaces. The method includes storing identifying characteristics of each of the parking spaces in a database. To request a parking space, a garage customer inputs data concerning his or her preferences for parking. The inventive method then determines which of the plurality of parking spaces are vacant, matches the data inputted by the user with the data identifying characteristics of each of the parking spaces determined to be vacant, and determines which of the parking spaces determined to be vacant most closely matches the data inputted by the user. The closest parking space is reserved for parking by the user.

20 Claims, 9 Drawing Sheets

PARKING GUIDANCE METHOD AND SYSTEM

BACKGROUND OF THE INVENTION

1. Field of the Invention

The present invention relates generally to a system for locating parking spaces and, more specifically, to a parking guidance method for finding an optimal parking space in a parking garage by using evaluation information for each parking space and categorizing the available parking spaces according to customer preference.

2. Description of the Prior Art

Presently no method exists for major parking garage companies to route their customers to parking spaces that best meet customers' needs. For example, when a customer enters a shopping mall garage more likely than not he or she will have a hard and frustrating time trying to find a desired parking space. During a holiday season a parking experience at a shopping mall can be exasperating. Many shopping mall customers have special parking needs, including sufficient space to park a larger vehicle, for example a sports utility vehicle, parking space next to a mall entrance or an entrance to a desired store within the mall, maternity or handicap parking, parking in secure or well lit areas, etc. Presently, in a crowded parking lot of a shopping mall or an airport, customers are left to drive for long periods of time searching and waiting for available parking space compatible with their needs. This haphazard manner of parking creates congestion, reduces the number of customers that are able to enter the garage and through it the mall, aggravates the customer, and causes revenue loss for both the garage and mall operators.

Numerous additional systems for monitoring, guiding, and managing vehicle parking have been provided in the prior art. For example, U.S. Pat. Nos. 3,376,547; 5,004,997; 5,091,727; 5,432,508; 5,504,314; 5,910,782; 5,940,481; 6,107,942; 6,147,624; 6,285,297 and 6,426,708 are all illustrative of such prior art. While these units may be suitable for the particular purpose to which they address, they would not be as suitable for the purposes of the present invention as heretofore described.

Apparatus for indicating the location of vacant parking places within a parking facility. A number of transducers, which are arranged throughout the parking facility and each of which monitors a particular parking place, are combined to operate with a single transceiver. This transceiver is selectively connected to each of said transducer, in turn, by switching circuits and as each parking place is monitored a corresponding indicator is made to register that place as occupied or vacant.

An electronic parking-aid device for guiding a motorist when parking a vehicle in a parking bay. The device includes a transmitter and receiver which respectively transmits a signal towards the front of an approaching vehicle and receives the signal reflected thereby. A computing apparatus coupled to the transmitter and receiver for computing the distance from the front of the vehicle to the device and a logic apparatus coupled to the computing apparatus compares the computed distance with a predetermined threshold so as to generate an output signal if the computed distance is less than the threshold. The logic apparatus compares the computed distance to two different thresholds so as to generate corresponding output signals if the computed distance is less than the lower threshold, or lies between the two thresholds, or is greater than the larger threshold. Red, amber and green indication lamps are connected to the logic apparatus and are responsive to the respective output signals so as to advise a motorist when he is safe to proceed, when he should proceed with caution, and when he should stop, respectively. Also a parking management system wherein each parking bay is provided with a parking-aid device for monitoring whether a respective parking bay is occupied or vacant.

An automated parking facility management system which determines when a vehicle is at a facility entrance, stores the locations of vacated facility parking spots, determines the location of a desirable vacated parking spot in relation to either the facility entrance or the facility exit, prints a parking record for the customer including the computed location, removes the compound location from the memory after it has been printed to prevent assigning the same spot to two vehicles, and then adds to computed location back into the memory when the vehicle is leaving the facility to make the location available to another vehicle.

Parking for vehicles is facilitated, monitored and controlled by using sensors to determine the availability of vacant parking spaces and by indications to alert vehicle operators at a substantial distance of the availability a vacant space. A computer controlled system monitors the sensors and controls the delivery indicator signals. Data regarding parking occupancy is used to uniform drivers entering the facility and prospective users, via a telephone interface, of the availability of parking. The telephone interface further allows users to reserve parking spaces and charge the cost of the reserved space.

The invention relates to a monitoring and/or directing system for parking areas which exhibit parking spaces. In order that the risk of theft is reduced and/if appropriate, incoming vehicles can be guided specifically to empty parking spaces, the monitoring and/or directing system is designed with at least one entrance and departure station provided for issue and retrieval of parking tickets fitted with an electronic identification element, with communicators which detect the parking tickets, there being arranged, at each parking space, at least one communicator which has a detection region directed towards the associated parking space, and with data lines via which the communicators and the entrance and departure stations are connected to a central computer.

An on-board vehicle navigation system parking space finder that offers a driver a competitive edge in finding available on-street parking. Drivers not familiar with an area are able to locate available metered parking spaces with ease. Drivers may be informed, on demand, of what type of currency they need for parking meters in certain areas, so they can stop for change, if necessary. Drivers will have information about maximum time limits for different parking meters, and can use this information to select meters with longer time limits, if necessary. Metered parking information specific to a vehicles current location, as well as metered parking information specific to a requested location, are made optionally available to drivers from within their vehicles.

A parking management communication system including a central control unit having a data base, a central interface unit and at least one user interface unit, the central interface unit being in communication with the at least one user interface unit via at least one of wired and wireless communication link.

A parking guidance and management system. The system provides graphical information regarding the relative availability of parking spaces within a parking garage or other large facility. The system relies on a video image sensing system wherein each space in the facility is monitored by a camera to determine whether or not it is occupied. A single camera may be used to determine the status of a plurality of spaces. The information is displayed at strategically located displays along the way to available spaces. The displays contain advertising messages adjacent to the information about space availability. Revenues generated by the sale of advertising can be used by the facility operator to defray the purchase and/or maintenance cost of the guidance and management system. The information obtained from the sensors at each parking space may be used to provide information to the manager of the facility regarding space utilization. Information regarding the occupancy status of each space may also be used as a check on receipts of parking fees and to identify abandoned vehicles.

Available spaces in a system may identified using detectors in each of the spaces. The detectors may communicate the availability of a space after detecting whether or not an item is currently situated at the space. This information may be assembled and displayed using mapping software to indicate available spaces. In addition, a user may be provided with information about how to traverse through the system of spaces to locate the available space. In one embodiment of the present invention, the available spaces are parking spaces and the user is a vehicle operator having an in-car personal computer system. An in-car personal computer systems may have a display showing a map of the parking facility, indicating an available space and providing directions to reach that space.

The invention provides a system for determining and communication the availability of parking spaces. The system includes an optical adapted to scan a plurality of the parking spaces and to produce scan data for the parking spaces scanned. The system also includes a processor adapted to receive the scan data from the optical detector and to determine the availability of the scanned parking spaces from the scan data. The system may include a telephone link and/or a radio transmitter for transmitting a signal to indicate the parking pace availability.

A parking advisor images scenes of a parking area and identifiers free spaces using image processing techniques. The advisor then makes recommendations as to which areas a driver should go based on the locations of free spaces. One way of outputting the recommendations is to display them on a terminal at an entry gate or to print them on a ticket, receipt, or other piece of paper. An entry terminal may be provided to allow the user to enter a preferred destination served by the parking area. For example, the destination could be a particular airline terminal or department store. The advisor may select, among the free spaces identified, those that are most convenient to the destination and provide corresponding directions.

SUMMARY OF THE PRESENT INVENTION

The present invention relates generally to a system for locating parking spaces and, more specifically, to a parking guidance method for finding an optimal parking space in a parking garage by using evaluation information for each parking space and categorizing the available parking spaces according to customer preference.

A primary object of the present invention is to provide a parking guidance system that overcomes the shortcomings of the prior art.

A further object of the present invention is to provide a parking guidance system that allows a customer to input criteria the customer feels is important when searching for a parking space.

Another object of the present invention is to provide a parking guidance system that uses a plurality of sensors to sense the availability of parking spaces.

A still further object of the present invention is to provide a parking guidance system that allows a garage operator to weight the input criteria based upon importance so that the customer may find an optimal parking space.

Yet another object of the present invention is to provide a parking guidance system that allows the garage operator to enter and store evaluation information relating to the individual parking spaces in the database.

Another object of the present invention is to provide a parking guidance system that compares the preference information entered by the customer with the descriptive information about individual parking spaces so that an optimal parking space may be located for the customer.

A still further object of the present invention is to provide a parking guidance system that includes an interface for receiving customer preference information about parking spaces from a plurality of peripheral devices.

An even further object of the present invention is to provide a parking guidance system that allows provision of customer preference information about parking spaces through wireless means.

Another object of the present invention is to provide a parking guidance system that, upon determining the location of an optimal parking space, a directional map for guiding the customer to the parking space is displayed.

Still further object of the present invention is to provide a parking guidance system that allows for traffic control within one garage facility and diversion of traffic to a facility that is less crowded.

Additional objects of the present invention will appear as the description proceeds.

The present invention overcomes the shortcomings of the prior art by providing a parking guidance system that uses a method that compares customer specific data with data about the parking structure in order to find an optimal parking space for a customer. Additionally, the system provides an output to a customer to allow the customer to quickly find the chosen optimal parking space.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
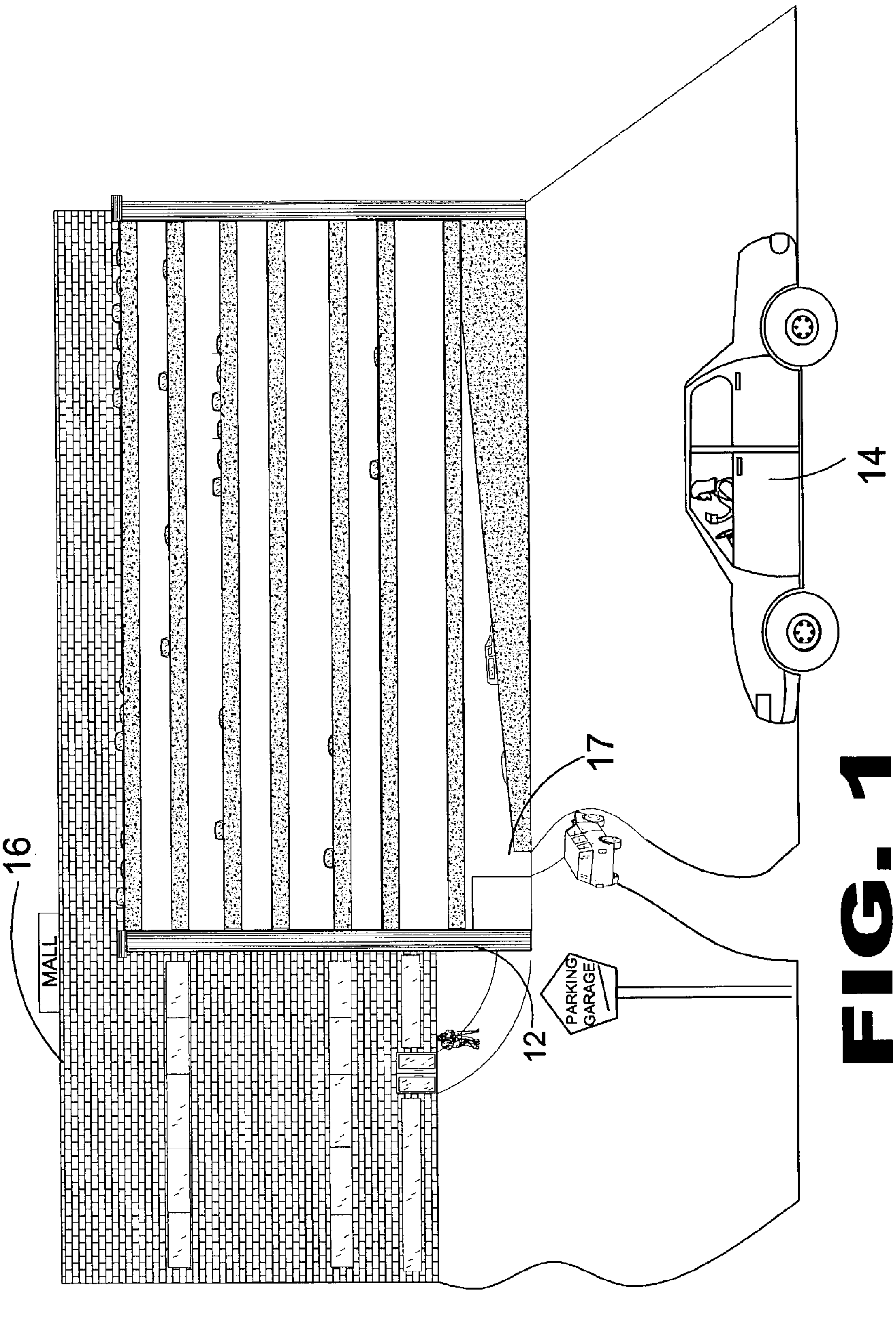
FIG. 1 is a perspective view of a vehicle approaching a parking garage located within or next to a shopping mall.

Turning now descriptively to the drawings, in which similar reference characters denote similar elements throughout the several views, the Figures illustrate the parking guidance system and method of the present invention. With regard to the reference numerals used, the following numbering is used throughout the various drawing Figures.

10 parking guidance system of the present invention
12 parking garage
14 vehicle
16 mall
17 parking garage entrance
18 parking spaces
20 vehicle sensor
22 central computing device
24 wireless computing devices
26 interface for entry of customer preferences
28 parking space descriptors
29 parking space confirmation ticket
30 common data bus
32 central processing unit (CPU)
34 memory
36 system clock
38 peripheral interface
40 video interface
42 input/output (I/O) interface
44 communications interface
46 multimedia interface
50 display
52 storage device
54 wireless telephone system
56 multimedia component
58 peripheral devices
60 network connection
70 matrix W

72 parking space descriptor 1
74 parking space descriptor 2
76 parking space descriptor 3
78 parking space descriptor 4
80 parking space descriptor 5
82 vector P
84 customer reference 1
86 customer reference 2
88 customer reference 3
90 customer reference 4
92 customer reference 5
94 built in communication device
96 data base processor of the customer interface 26
98 power source of the customer interface 26
100 web server of the customer interface 26
102 parking sensor of the customer interface 26
104 vehicle sensor of the customer interface 26
106 transmitter of the customer interface 26
108 receiver of the customer interface 26
110 processor of the vehicle device 94
112 power source of the vehicle device 94
114 video display vehicle device 94
116 input peripherals of the vehicle device 94
118 receiver of the vehicle device 94
120 transmitter of the vehicle device 94
122 transmission signal from the vehicle device 94 to the customer interface 26
123 printer of the central computing device 22
124 power source of the central computing device 22
126 receiver of the central computing device 22
128 transmitter of the central computing device 22
130 transmission signal from the customer interface 26 to the central computer 22
132 transmission signal from the central computer 22 to the customer interface 26
134 transmission signal from the customer interface 26 to the vehicle device 94

DETAILED DESCRIPTION OF THE PREFERRED EMBODIMENT

Turning now descriptively to the drawings, in which similar reference characters denote similar elements throughout the several views, FIGS. 1 through 5 illustrate a parking guidance system of the present invention indicated generally by the numeral 10.

FIG. 1 illustrates, a customer driving to a shopping mall 16. The customer may need to park his or her vehicle 14 in a parking garage 12. As the customer approaches the entrance 17 to the garage 12, he or she may provide preferential information such as where in the mall 16 the customer wants to be or the type of the vehicle the customer is driving. This information is necessary to ascertain the size of the vehicle and hence the size of the parking space required. This information also aids the system in finding a parking space by providing other customer preferences and/or requirements, e.g., if handicap parking is needed. As will be seen from the description below, the inventive method decreases the amount of vehicle traffic congestion caused by customers' driving within the garage looking for parking spaces thereby increasing the flow of traffic through the garage and the time customers spend shopping in the mall. The parking experience is made more enjoyable and reduces the number of accidents occurring in the parking lot.

Figure 2:
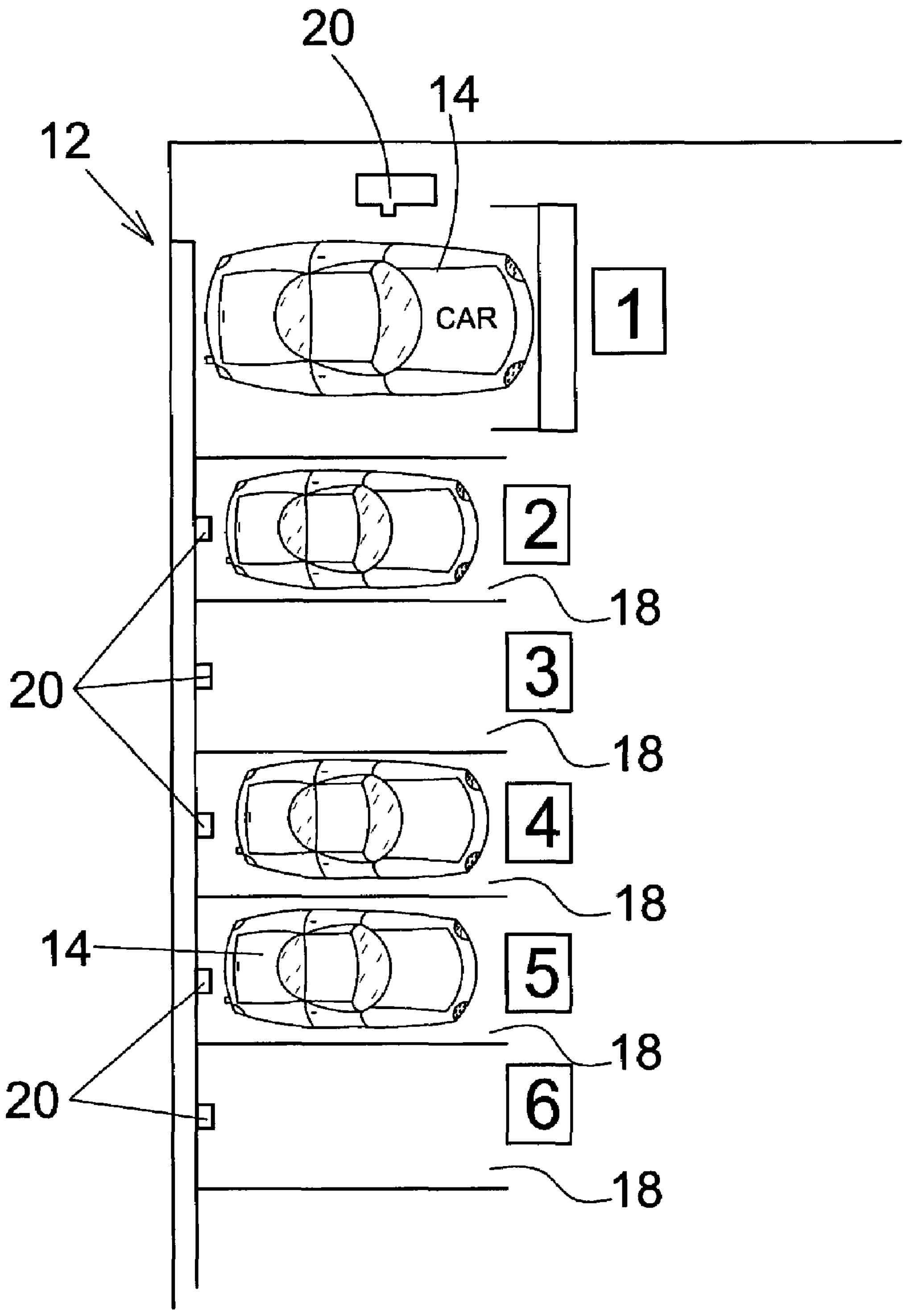
FIG. 2 is an overhead view of a section of a parking garage using the guidance method of the present invention.

FIG. 2 is an overhead view of a section of a parking garage 12 including the parking guidance system 10 of the present invention. Vehicles 14 are parked in parking spaces 18. For illustrative purposes parking spaces 18 are marked by numerals 1 through 6. These numerals are for illustrative purposes only and are not required for implementation of the present invention. Each parking space 18 includes a vehicle sensor 20. The vehicle sensors 20 are mounted throughout the parking garage 12 to determine if parking spaces 18 are occupied. The vehicle sensor 20 is included to ascertain presence of a vehicle 14 in the parking space 18. The vehicle sensor 20 can be any sensor that is able to detect the presence of the vehicle 14 in the parking space 18, through contact sensing, weight difference sensing, non-contact optical sensing, ultrasonic sensing etc. Additionally, the vehicle sensor 20 can be a simple switch set and reset by an attendant, either remotely or manually on location in the parking space, to indicate the presence or absence of the vehicle 14 in the parking space 18. The vehicle sensors 20 relay data regarding available space to a central computing device 22 which is described below with reference to FIG. 3 of the present invention. The central computing device 22 (FIG. 3) can be a stand alone single computer or a cluster of computers, which can be centrally located or distributed in a networking environment either locally or over a wide area such as the Internet.

Figure 3:
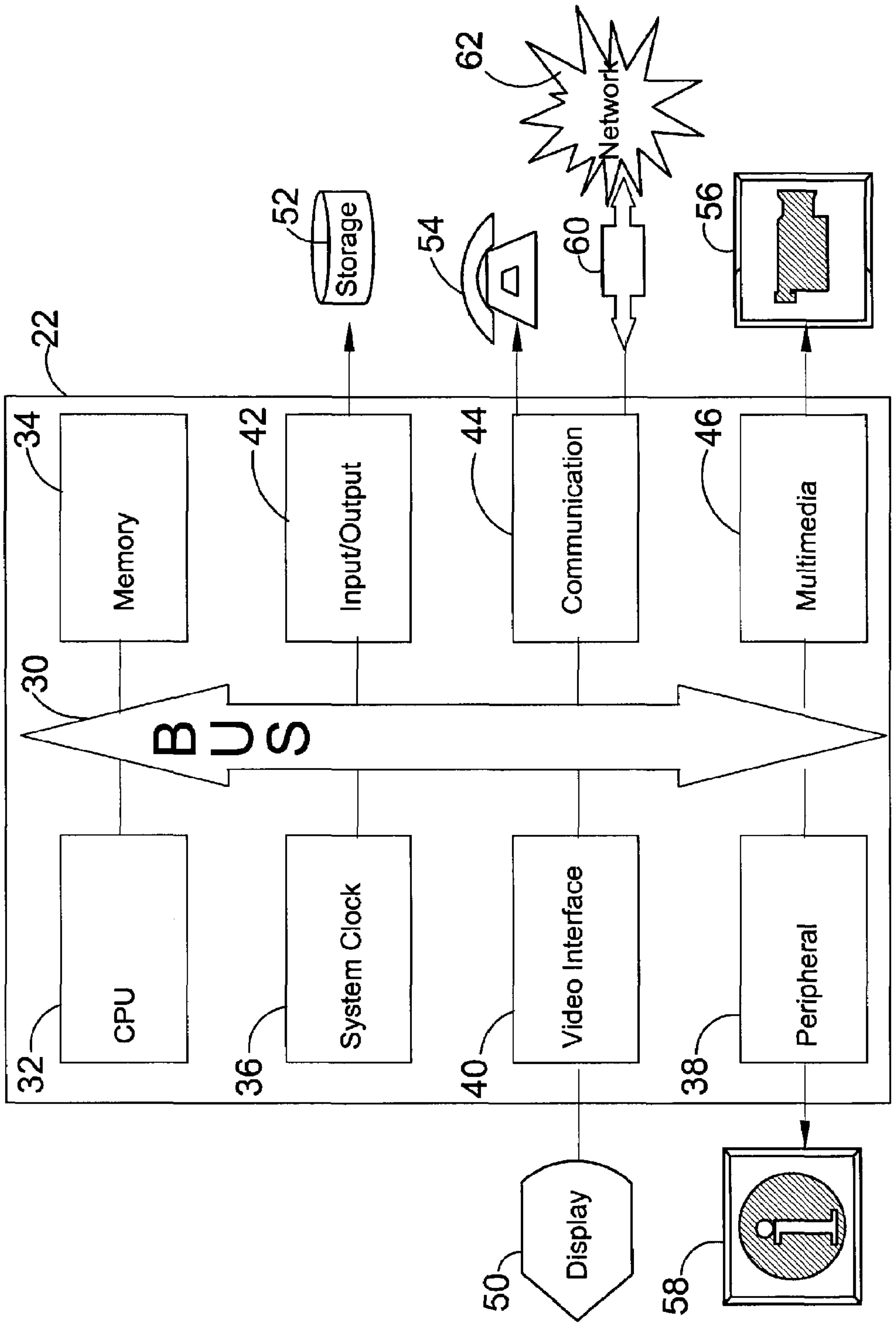
FIG. 3 is a block diagram showing the components of the computing device of the parking guidance system of the present invention.

FIG. 3 shows the components of the computing device 22 used in implementation of the parking guidance system of the present invention. The computing device 22 may take the configuration of any computer ranging from mainframes and personal computers (PCs) to digital telephones and personal digital assistants (PDA) or hand held devices, e.g., Palm Pilot™. In one illustrative embodiment of this invention shown in FIG. 3, such computing devices may comprise data bus 30, which is connected directly to each of the following:

- a central processing unit (CPU) 32;
- a memory 34;
- a system clock 36;
- a peripheral interface 38;
- a video interface 40;
- an input/output (I/O) interface 42;
- a communications interface 44; and
- a multimedia interface 46.

The common data bus 30 is further connected

- by the video interface 40 to a display 50;
- by the I/O interface 42 to storage device 52, which may illustratively take the form of memory gates, disks, diskettes, compact disks (CD), digital video disks (DVD), etc.;
- by the multimedia interface 46 to any multimedia component 56 such as a video camera;
- by peripheral interface 38 to peripheral devices 58 such as a keyboard, mouse, navigational buttons, e.g., on a digital phone, a touch screen, and/or writing screen on full size and hand held devices such as a Palm Pilo™;
- by the communications interface 44, e.g., a plurality of modems, to a network connection 60, e.g., an Internet Service Provider (ISP) and to other services, which is in turn connected to the network 62, whereby a data path is provided between the network 62 and the computing device 22, and, in particular, the common bus 30 of this computing device; and furthermore,
- by the communications interface 44 to the wired and/or the wireless telephone system 54.

Figure 4:
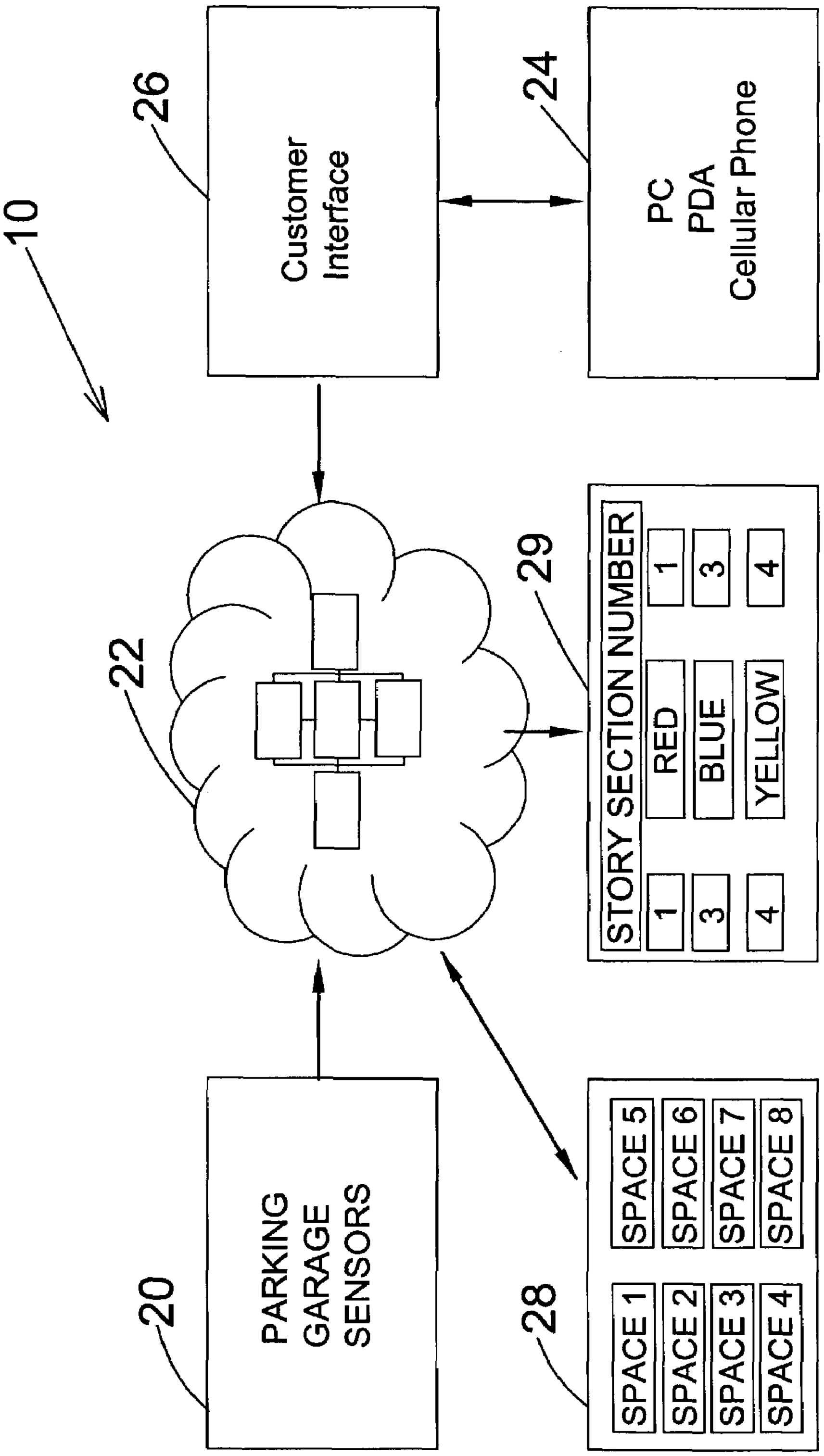
FIG. 4 is a block diagram of the parking guidance system of the present invention for use in assisting a customer in locating an optimal parking space for his/her vehicle.

FIG. 4 is a block diagram of the parking guidance system 10 of the present invention used to assist customers in locating parking spaces for their vehicles 14 according to the customer's preferences provided via an interface 26 to the main computing device 22 for the location of such spaces. Additionally, the parking guidance system 10 computes the optimal match of customer's preferences and available parking spaces in a parking garage. The optimal parking space, for example the parking space 18 marked with the numeral 3 as it is shown in FIG. 2, is determined in the following way.

1) Information 28 about each parking space 18 is documented by a garage operator before the parking guidance system 10 goes into operation. As descriptors change over time, the garage operator can modify the preference information 28 and re-load it into the main computing device 22;

2) The current availability of the parking space 18, marked with the numeral 3 as it is shown in FIG. 2, is provided by the parking garage sensors 20. As described above with reference to FIG. 2, the parking garage sensors 20 may be installed within each of the parking spaces 18; and 3) Preferences of the parking customer are provided to the parking guidance system 10 via the interface 26 by computing devices 24 such as those described with reference to FIG. 3.

As a result of determinations made by the parking guidance system 10, the customer is presented with a prioritized list 29 of possible parking space selections. This prioritized list 29 can be displayed, be printed on a ticket provided at the entrance to the garage or a digital file retrieved by the customer or sent to the customer's e-mail address or his/her computing device such as a cell phone or a PDA.

Information about each Parking Space

The garage operator using the parking guidance system 10, evaluates each parking space 18 and documents evaluated information in a fixed array or matrix. This matrix, for example named W, includes M rows and N columns and is discussed herein below. Each of the M rows corresponds to one of the parking spaces in the garage and each of the N columns corresponds to one of the descriptors of the parking spaces. Therefore, in a parking garage having 482 parking spaces, M is equal to 482 and the matrix W will have 482 rows.

A limited embodiment of the inventive parking guidance system 10 may use five descriptors, i.e., N=5, where:

1) handicapped parking;

2) safety level (proximity to security guard booth);

3) proximity to store A;

4) proximity to restaurant B; and 5) only used for compact cars.

The matrix W identified by the numeral 70 may be constructed using commercially available software spreadsheet packages such as Microsoft Excel™ or Corel Corporation's Lotus 123™. Alternatively, a computer program may be written to prompt a garage operator to enter descriptors or to select a preferred descriptor from a choice displayed by such program.

Figure 5:
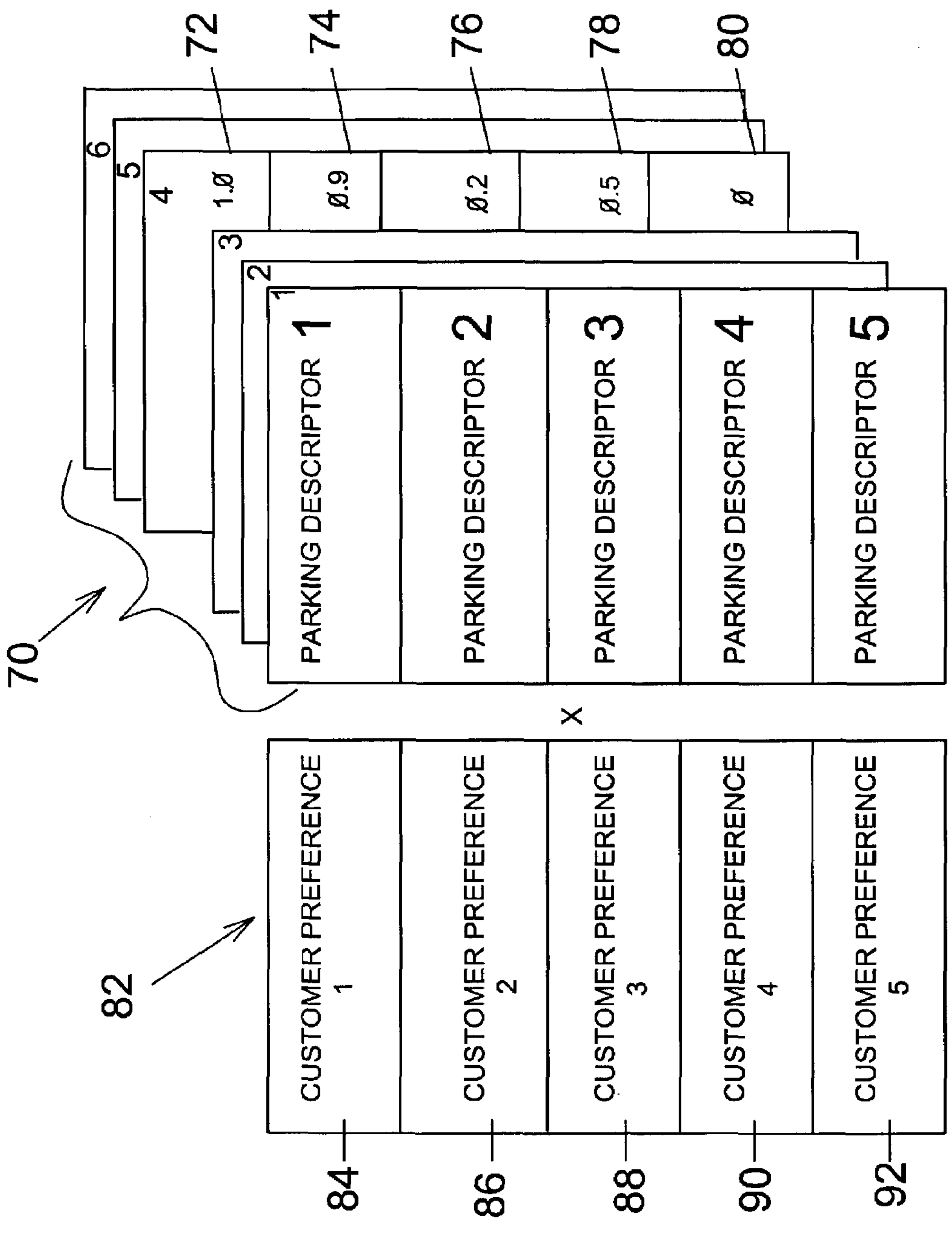
FIG. 5 is a block diagram showing the makeup of the matrix W and vector P of the parking guidance system of the present invention.

FIG. 5 illustrates the matrix W 70 having six rows (M=6) corresponding to the number of parking spaces shown in FIG. 2 and five columns (N=5) corresponding to the total number of descriptors. This arrangement is depicted by the matrix W 70 as follows:

$$W = \begin{bmatrix} w_{11} & w_{12} & w_{13} & w_{14} & w_{15} \\ w_{21} & w_{22} & w_{23} & w_{24} & w_{25} \\ w_{31} & w_{32} & w_{33} & w_{34} & w_{35} \\ w_{41} & w_{42} & w_{43} & w_{44} & w_{45} \\ w_{51} & w_{52} & w_{53} & w_{54} & w_{55} \\ w_{61} & w_{62} & w_{63} & w_{64} & w_{65} \end{bmatrix}$$

Here, the parking space three may have the following associated descriptors:

| | |
|---|---|
| 1) handicapped parking | $w_{31}$ 72 = 0 (i.e., no) |
| 2) safety level | $w_{32}$ 74 = 0.9 (i.e., proximity to guard booth) |
| 3) proximity to store A | $w_{33}$ 76 = 0.2 |
| 4) proximity to restaurant B | $w_{34}$ 78 = 0.5 |
| 5) compact cars only | $w_{35}$ 80 = 0 (no) |

Each descriptor of each parking space is assigned a weight by the garage owners. The garage owners may decide to modify weights in matrix W in time, for instance, over the course of 24 hours the safety ratings to various locations may change, or over the course of a year store locations may move.

The weight of the descriptors for matrix W 70 may be modified as the garage 12 traffic patterns or the distribution of stores in the mall 16 change over time, for example, store A closes or store B changes its location. Moreover, the descriptor's weight may allow preferred treatment for customers with particular preferences, for example, preferred parking for patrons of a newly opened restaurant. The preferential treatment may be provided to the customer either free of charge or for an additional fee by increasing or decreasing weights of specific parking spaces. Similar to the matrix W 70, the weights may be assigned using the commercial spreadsheet programs or a custom package.

To eliminate consideration of an occupied parking location, the rows of matrix W corresponding to occupied locations are set to zero. A parking spot is considered occupied if either 1) the sensors 20 determine the location if partially occupied, or
2) the central computer 22 determines that the space was recently assigned to another parking customer (e.g., was assigned within previous five minutes).

This time limit causes assigned spaces to be released back into the availability pool should a driver choose to park in a different location than directed.

Customer Preferences

To request an available parking space, customers provide their preferences to the customer interface of the parking guidance system 10. What the customer provides is all or a subset of descriptors identified and assigned to individual parking spaces as described above. In the exemplary embodiment, the descriptors include:

1) handicap parking;
2) safety level (proximity to guard booth);
3) proximity to store A;
4) proximity to restaurant B; and
5) only used for compact cars.

The customer can select the section that best corresponds to their destination and needs through the use of input peripherals connected to the computing device 22, such as touch screen displays, display screens with keyboards, or voice activated peripherals. Preferably, input peripherals are located near the entrance 17 (FIG. 1) to the garage 12.

To speed-up provision of customer's preferences, a diagram of the garage 12 as shown in FIG. 2 may be displayed on a touch screen, and the appropriate location may be selected by the customer. Another manner of entry of customer's preferences may be through easy reference hypertext markup language (HTML) menus such as those commonly used with the Internet web pages. Graphical menus may also be used. Garage sections may be displayed with magnified or higher resolution upon selection.

It is important to note that some data regarding the customer preferences may be assessed automatically by sensors installed throughout the garage 12. For instance, the vehicle size may be sensed automatically.

Returning now to FIG. 5, the provided list of customer preferences is then stored in a 1×N vector P 82, representing each preference's relative importance, where N is the number of available preference descriptors 84–92. For example:

$$P = \begin{bmatrix} p_1 \\ p_2 \\ p_3 \\ p_4 \\ p_5 \end{bmatrix} \begin{matrix} \text{- handicapped parking 84 = 0 (no)} \\ \text{- safety level 86 = 0 (don't care)} \\ \text{- poximity to store A 88 = 1 (very important)} \\ \text{- proximity to restaurant B 90 = 0 (not entered - default)} \\ \text{- compact cars only 92 = 1 (yes - auto sensed).} \end{matrix}$$

All information not specifically selected by the customer is assigned a default value. Similar to the manner of entry of the matrix W 70, vector P 82 may be entered using the commercially available spreadsheet programs or a custom made programming interface and store in a file in storage component 52 of the computing device 22 shown in FIG. 3.

Determination

To find the available parking spaces answering to the customer preferences, the resulting matrix $W_R$ of available parking space weights is multiplied by the vector P of consumer preferences to result in a weighted score matrix S having L rows, where L is the number of available parking spaces. In the exemplary embodiment, L is equal to two, specifically parking spaces 3 and 6 shown in FIG. 2. Each row of the weighted score matrix S will have the following representation:

$$S_i = W_{ij} \times P_j;, \text{ that is}$$

$$S = \begin{bmatrix} s_1 \\ s_2 \\ s_3 \\ s_4 \\ s_5 \\ s_6 \end{bmatrix} \begin{matrix} = w_{11} * p_1 + w_{12} * p_2 + w_{13} * p_3 + w_{14} * p_4 + w_{15} * p_5 \\ = w_{21} * p_1 + w_{22} * p_2 + w_{23} * p_3 + w_{24} * p_4 + w_{25} * p_5 \\ = w_{31} * p_1 + w_{32} * p_2 + w_{33} * p_3 + w_{34} * p_4 + w_{35} * p_5 \\ = w_{41} * p_1 + w_{42} * p_2 + w_{43} * p_3 + w_{44} * p_4 + w_{45} * p_5 \\ = w_{51} * p_1 + w_{52} * p_2 + w_{53} * p_3 + w_{54} * p_4 + w_{55} * p_5 \\ = w_{61} * p_1 + w_{62} * p_2 + w_{63} * p_3 + w_{64} * p_4 + w_{65} * p_5 \end{matrix}$$

Alternative non-linear combinations of the parking space description matrix W 70 and the customer's preferences vector P 82 can be envisioned. For example, some numbers in vector P 82, the customer selects $p_3$ the distance to the store A to be 10 feet, may be divided by the corresponding fields in the matrix W 70, $w_{33}$ 76 the distance to the store A from parking space 18 marked with numeral 3 in FIG. 2 to be 30 feet and $W_{63}$ the distance to the store A from parking space 18 marked with numeral 6 to be 80 feet. The closeness to the store A may be measured, e.g., $s_i=w_{ij}/p_i$. Here $S_3=w_{33}/p_3=3$ and $S_3=w_{63}/p_3=8$, proving parking space 18 marked with numeral 3 to be preferred as being closer to the customer's preference.

For every vehicle that enters the garage, the matrix multiplication S=W×P is performed. The S vector is of size L, the number of available parking spaces, and provides the preference score for each parking space 18. The optimum unoccupied parking space 18 corresponds to the highest value row of matrix S. As described above, each parking space is described in the matrix W 70, by descriptors $w_{ij}$, where (i) is the parking space number and (j) is the pre-assigned preference number or weight of the descriptor.

Tickets

As discussed above, the garage operator enters data 28 describing the descriptors of each parking space 18 into a matrix W 70. To determine available parking spaces, rows in matrix W 70 representing filled parking spaces (as determined by parking space sensors 20) are temporarily replaced with zeros. The customer preference information is accepted through peripheral devices connected to customer interface 26 preferably placed near the entrance 17 to the garage 12. Alternatively, customer preference information may be provided through the use of customer's PC's, land-line telephones, cell phone, or PDA's indicated by numeral 24 to access the customer interface 26 to the computing device 22 of the parking guidance system 10.

Figure 6:
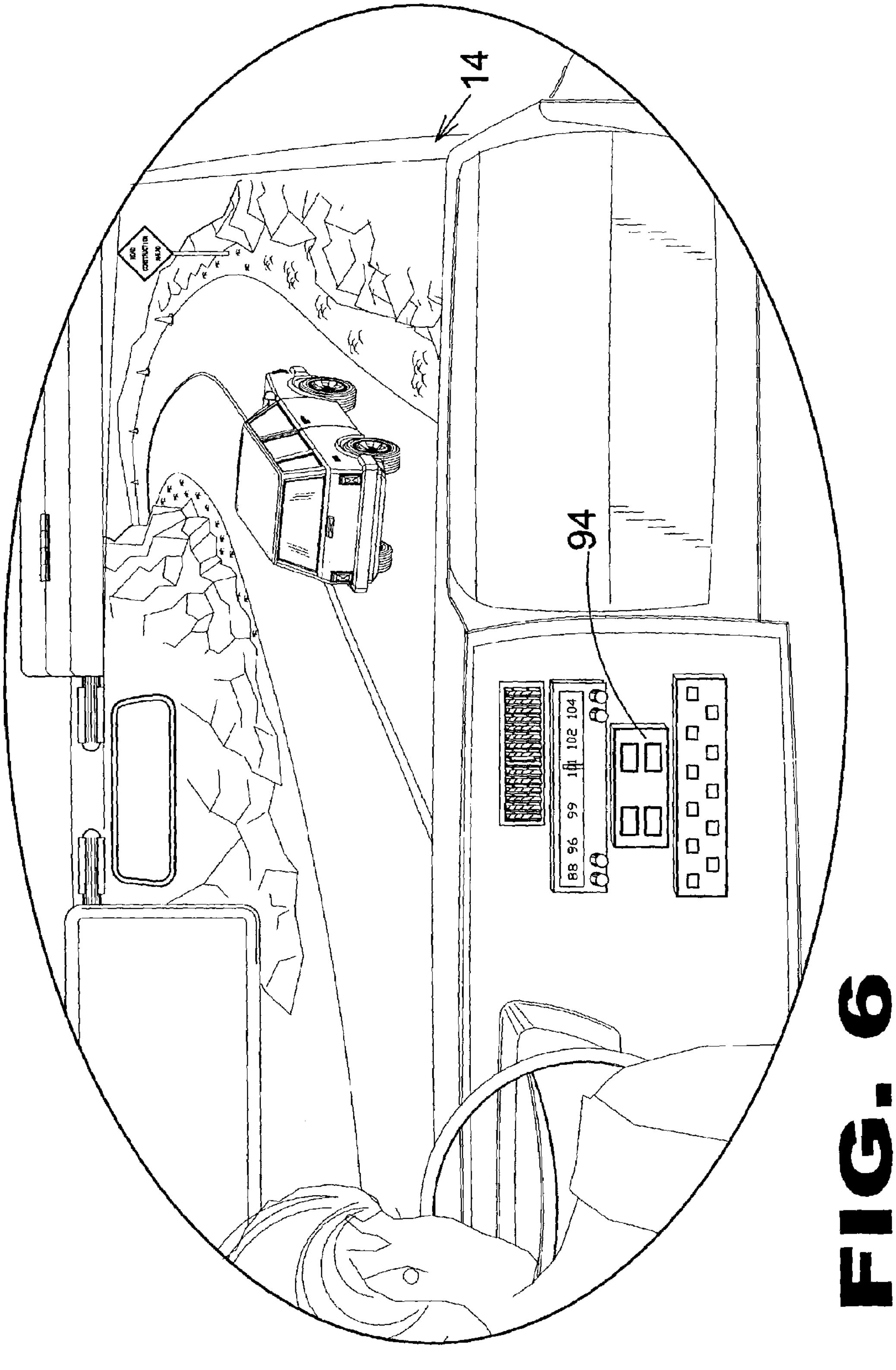
FIG. 6 is a perspective view of a vehicle driving on a road with its driver communicating his or her preferences for a parking space to the parking guidance system of the present invention.
Figure 7:
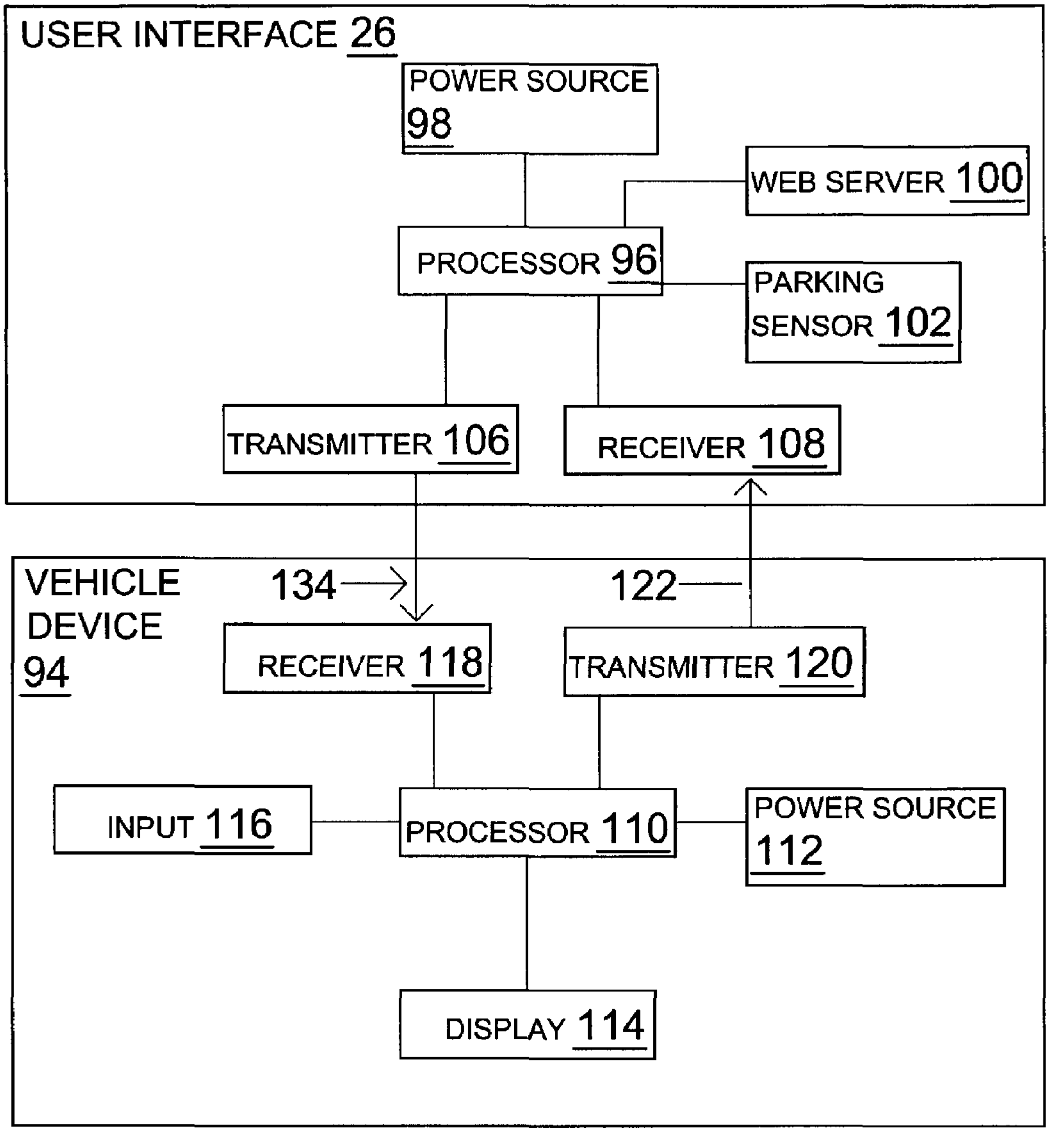
FIG. 7 is a block diagram showing the relationship between a computing device built into a vehicle and a central computer's interface of the parking guidance system of the present invention.
Figure 8:
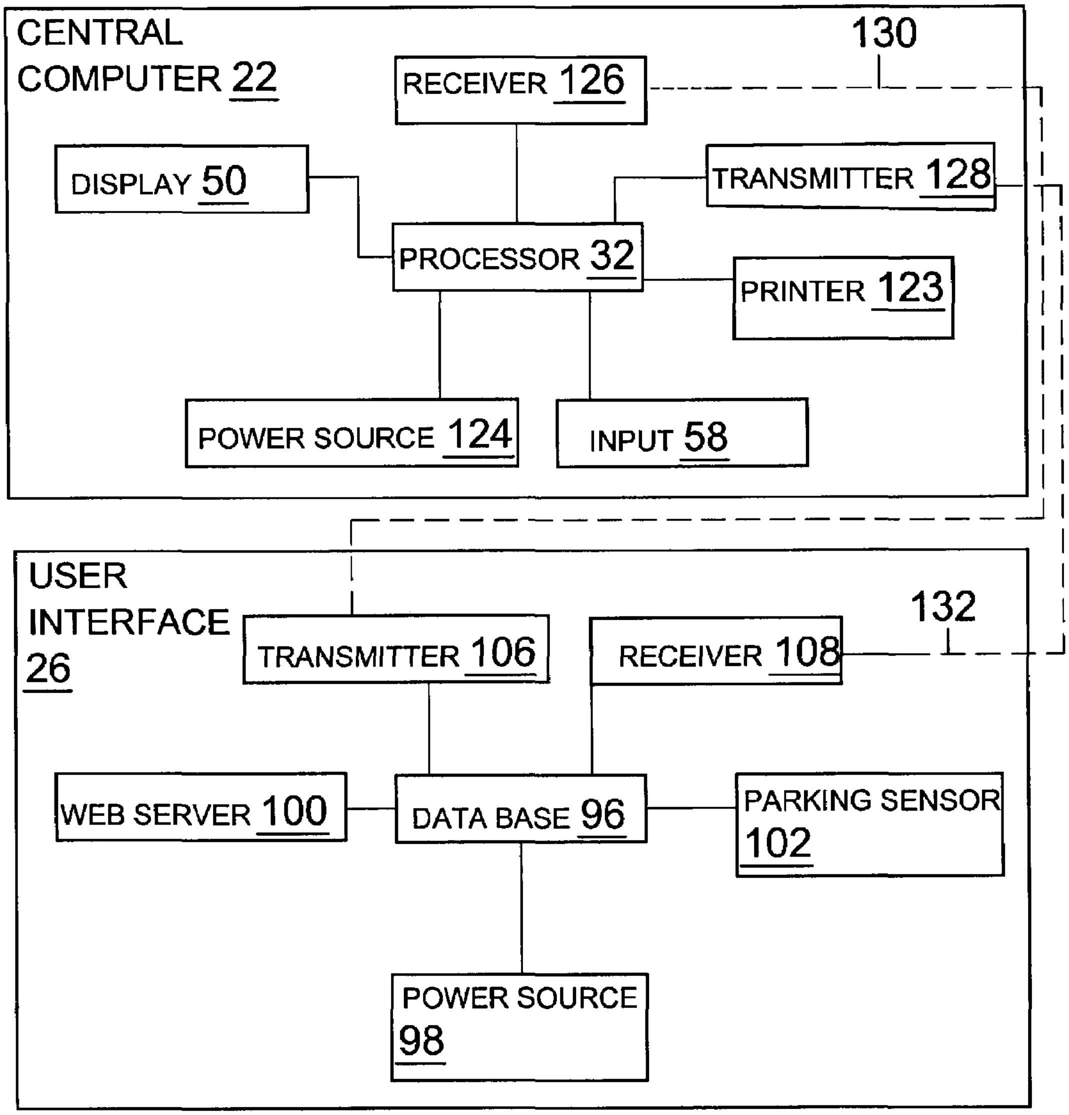
FIG. 8 is a block diagram showing the communication of the customer preferences and a list of selected parking spaces between the central computing device and the consumer interface of the parking guidance system of the present invention.

In one exemplary embodiment of the invention, shown in FIG. 6, the customer preference information may be provided to the interface 26 via a computing device 94 built in to the dashboard of the vehicle 14. FIGS. 7 and 8 illustrate the interaction between such computing device 94 built into the dashboard and the central computer 22 executing the parking guidance system 10. First, as illustrated in FIG. 7, the customer interface 26 may include a database processor 96 connected to a power source 98, a web server 100 for receiving requests via the Internet, parking sensors 102, vehicle sensors 104, a transmitter 106 and a receiver 108. The vehicle computing device 94 includes a processor 110 connected to a power source 112, a video display 114, an input peripheral 116, and a receiver 118 and a transmitter 120.

FIG. 8 illustrates the interaction between the central computing device 22 and the customer interface 26. The central computing device 22 includes a processor 32 connected to a power source 124, the video display 50, the input peripherals 58, a printer 123; and two components of the communications interface 44 a receiver 126 and transmitter 128.

To receive an assignment of a parking space 18 the customer must submit his or her preference information to the central computer 22. This is achieved by entering information to the processor 110 through the input peripherals 116. The processor 110 then passes the information to the transmitter 120, which communicates the information via a signal 122 to a receiver 108 of the customer interface 26 and through it into the database processor 96. The database processor 98 passes the information to its transmitter 106, which communicates the information via a signal 130 to a receiver 126 of the central computer 22 and through it into the processor 32.

After the, parking space determination is made as described above, the tickets describing the allocated parking space 18 and direction to it along with any possible promotional information, may be forwarded to the customer at the vehicle device 94 and displayed on the video display 114. This is accomplished as the processor 32 passes the ticket information to the transmitter 128, which transmits a signal 132 including the information to the receiver 102 of the customer interface 26 and into the database processor 96. The database processor 96 then passes the ticket information to the transmitter 106, which transmits a signal 134 includes the information to a receiver 118 of the vehicle device 94 and the processor 110. The processor 110 then displays the ticket to the customer on the video display 114. The forwarded ticket 29 may be retrieved by the customer from the interface 26 or sent to the customer's e-mail address or, using infrared technology such as bluetooth, to his/her cell phone or a PDA.

Statistics, such as the number of requests for a particular store or handicap parking, or continuous availability of free parking spaces in a particular area of the garage, may be calculated via data saved in the storage device 52. Such information may prove useful in controlling traffic within the garage. Additionally, when a number of malls utilize the parking guidance system 10, mall crowding can be controlled by informing customers who contact the parking guidance system 10 of one mall that another nearby identical mall has more favorable parking availability.

Figure 9:
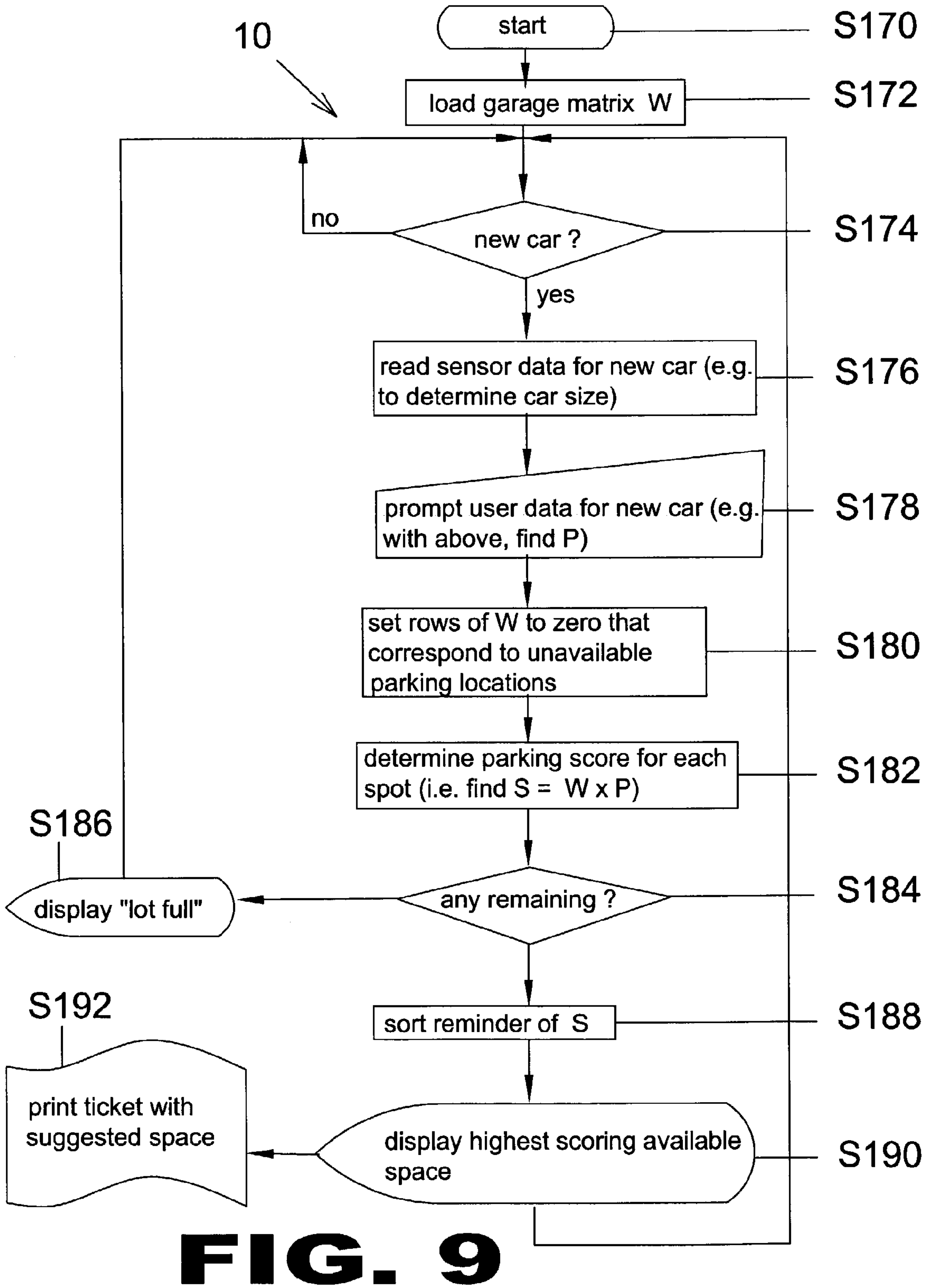
FIG. 9 is a flowchart showing the operation of the parking guidance system of the present invention.

FIG. 9 is a flowchart showing the operation of the parking guidance system of the present invention. After starting in step S170, the parking guidance system 10 loads matrix W of parking space descriptors in step S172. In step S174 the system determines if the vehicle seeking the parking space is new to the system, e.g., has not yet been assigned a parking space. Vehicles previously assigned parking spaces will not be considered. In step S176 the car size is determined by sensors installed in the garage. Alternatively, the car size is provided by the customer together with other preference information such as near what store does the customer would like to park provided in step S178.

In step S180 the parking guidance system 10 determines the score of each parking space according to the formula S=W×P. This formula and its individual components are described above. In step S1182 all the parking spaces currently occupied are eliminated from consideration by setting their corresponding row entries in matrix W to zero. If it is determined in step S184 that there are no available parking spaces in the garage, this will be reported to the customer via a display in step S186. If on the other hand parking spaces are available, the list of available parking spaces is sorted in step S188 and is displayed in step S190. Additionally, a ticket with the parking space number may be printed in step S1192 and made available to the customer.

From the above description it can be seen that the parking guidance system 10 of the present invention is able to overcome the shortcomings of prior art devices.

It will be understood that each of the elements described above, or two or more together, may also find useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of matching a vehicle with a vacant parking space of a plurality of parking spaces said method comprising the steps of:

a) storing data identifying characteristics of each of said plurality of parking spaces in a database;

b) inputting data concerning preferences for parking by a user;

c) determining which of said plurality of parking spaces are vacant;

d) matching said data input by said user with said data identifying characteristics of each of said plurality of parking spaces determined to be vacant;

e) determining which of said parking spaces determined to be vacant most closely matches said data input by said user;

f) reserving said parking space determined for said user; and g) indicating said parking space is available, if a time limit passes and said parking space is vacant, wherein said time limit is less than a maximum time amount said user is allowed to continuously park in said parking space.

2. The method of claim 1, wherein said data identifying characteristics comprises a set of descriptors, including, a total of parking spaces in said parking garage, a size of said parking space, position of said parking space relative to particular points of interest, whether said parking space is for use by handicapped, safety of said parking space.

3. The method of claim 1, wherein said step of determining which of said plurality of parking spaces are vacant is determined based upon signals received from parking sensors installed in each of said plurality of parking spaces.

4. The method of claim 3, wherein said plurality of parking sensors are motion detection sensors.

5. The method of claim 3, wherein said plurality of parking sensors are infrared frequency sensors.

6. The method of claim 3, wherein said plurality of parking sensors are switches turned on and off by a garage staff according to the availability of each parking space.

7. The method of claim 1, wherein said step of determining which of said plurality of parking spaces are vacant is determined by manually indicating availability of each parking space.

8. The method of claim 1, wherein said data concerning preferences includes data regarding predetermined number of preferences for the user.

9. The method of claim 8, wherein said step of inputting is performed through a plurality of input peripheral devices installed in the parking garage.

10. The method of claim 8, wherein said step of inputting is performed through a plurality of computing devices.

11. The method of claim 8, wherein said step of inputting is performed through a plurality of vehicle sensors positioned at an entrance to the parking garage, said plurality of vehicle sensors determining size of a vehicle.

12. The method of claim 1, further comprising the step of providing the user with a list of vacant parking spaces matched to user preferences.

13. The method of claim 12, wherein said step of providing produces a printed ticket listing vacant parking spaces.

14. A parking guidance system comprising:

a plurality of parking spaces;

a database, wherein said database stores identifying characteristic data of each of said plurality of parking spaces;

an input device, wherein said input device enables a user to input parking preference data;

a processor operably coupled to said database and to said input device, wherein said processor determines a vacant parking space pool, wherein said vacant parking space pool includes one or more parking spaces in said plurality of parking spaces that are vacant; wherein said processor also matches said parking preference data with said identifying characteristic data of each parking space in said vacant parking space pool; wherein said processor also determines a preferred parking space, wherein said preferred parking space is the parking space in said vacant parking space pool whose identifying characteristic data most closely matches said parking preference data; wherein said processor also reserves said preferred parking space; and wherein said processor also indicates said preferred parking space is available, if a time limit passes and said preferred parking space is vacant wherein said time limit is less than a maximum time amount said user is allowed to continuously park in said parking space.

15. The parking guidance system of claim 14, wherein said identifying characteristic data comprises a set of descriptors, including, a total of parking spaces in said parking garage, a size of said parking space, position of said parking space relative to particular points of interest, whether said parking space is for use by handicapped, safety of said parking space.

16. The parking guidance system of claim 14, further comprising:

a parking sensor operably coupled to said processor, wherein said parking sensor senses whether a parking space of said plurality of parking spaces is vacant.

17. The parking guidance system of claim 16, wherein said parking sensor is a motion detection sensor.

18. The parking guidance system of claim 16, wherein said parking sensor is an infrared frequency sensor.

19. The parking guidance system of claim 14, further comprising:

an output device operably coupled to said processor, wherein said output device provides the user with a list of vacant parking spaces.

20. The parking guidance system of claim 19, wherein said output device provides a printed ticket including said list.

* * * * *